United States Patent Office 2,724,830
Patented Nov. 22, 1955

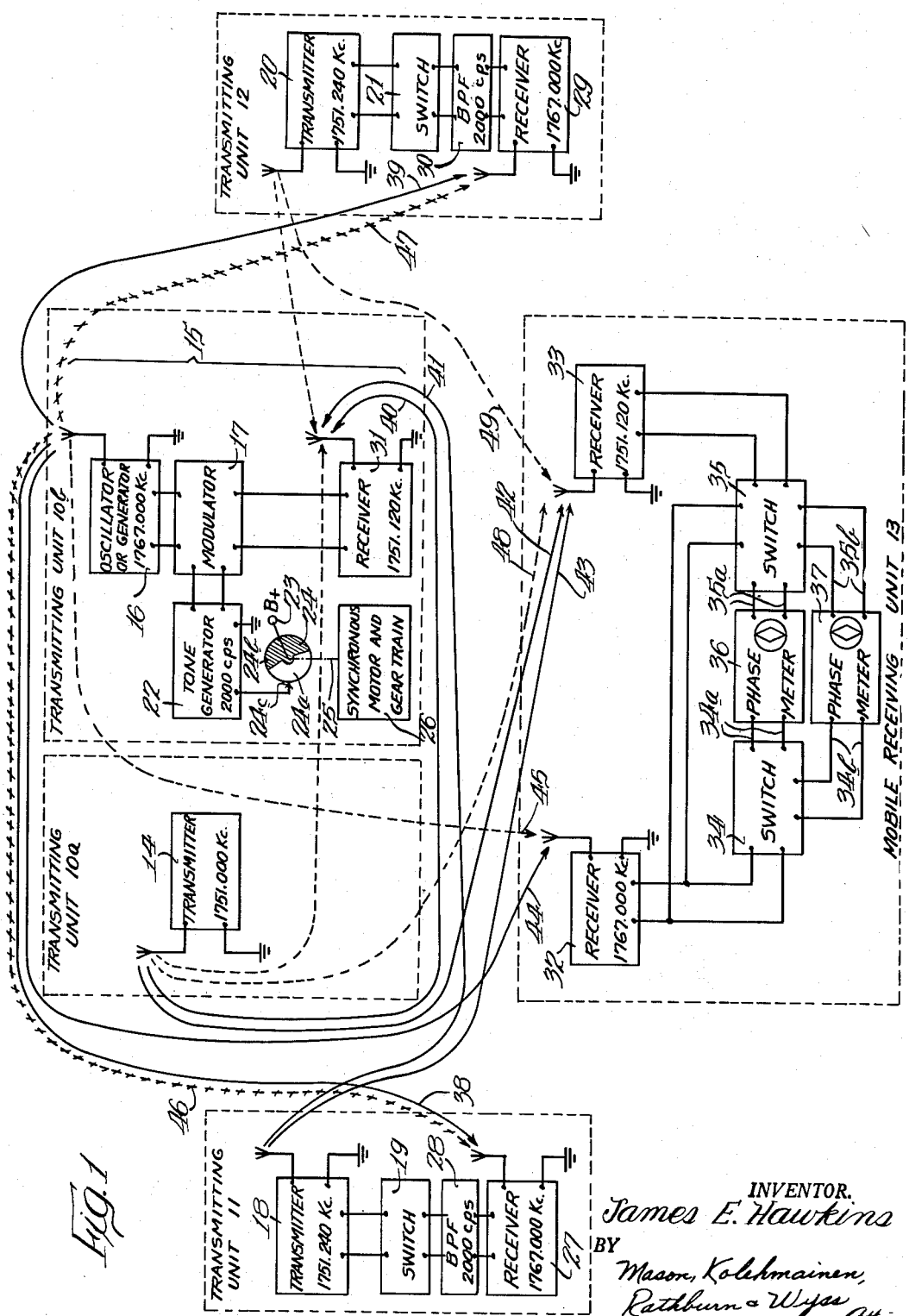

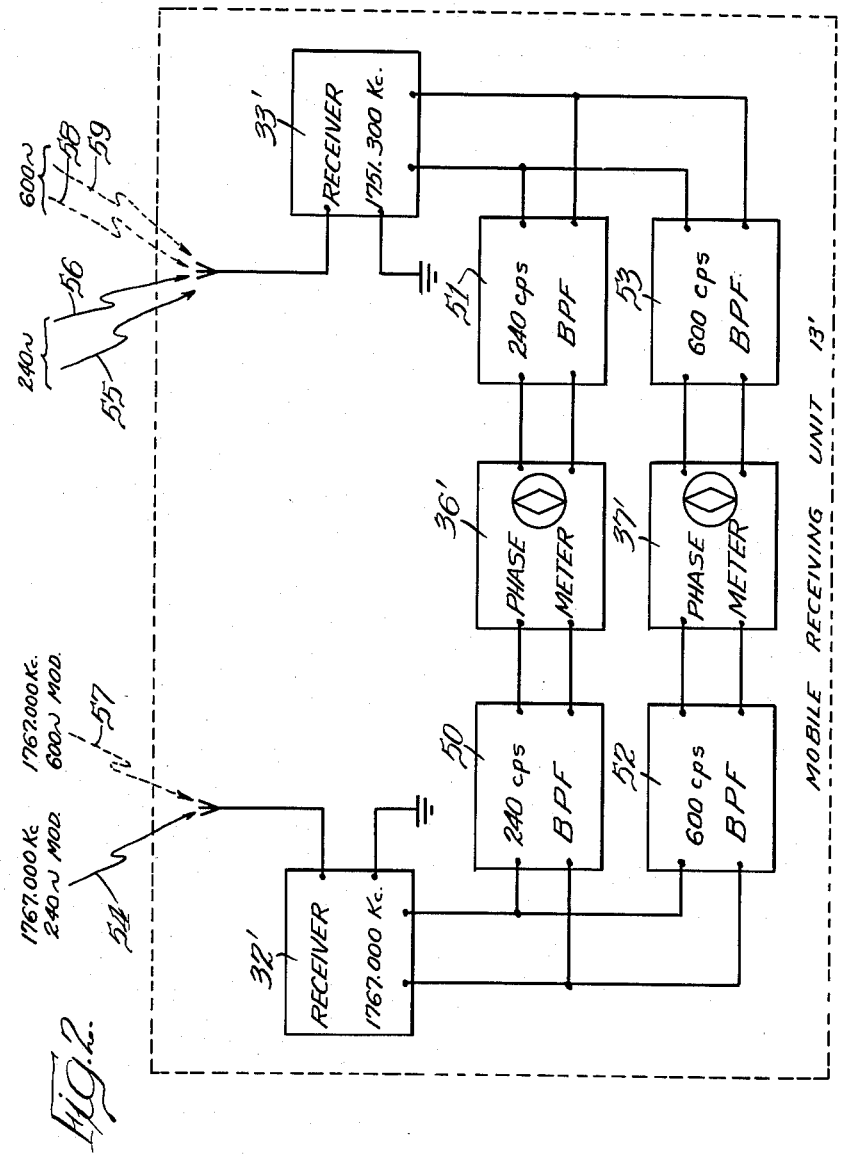

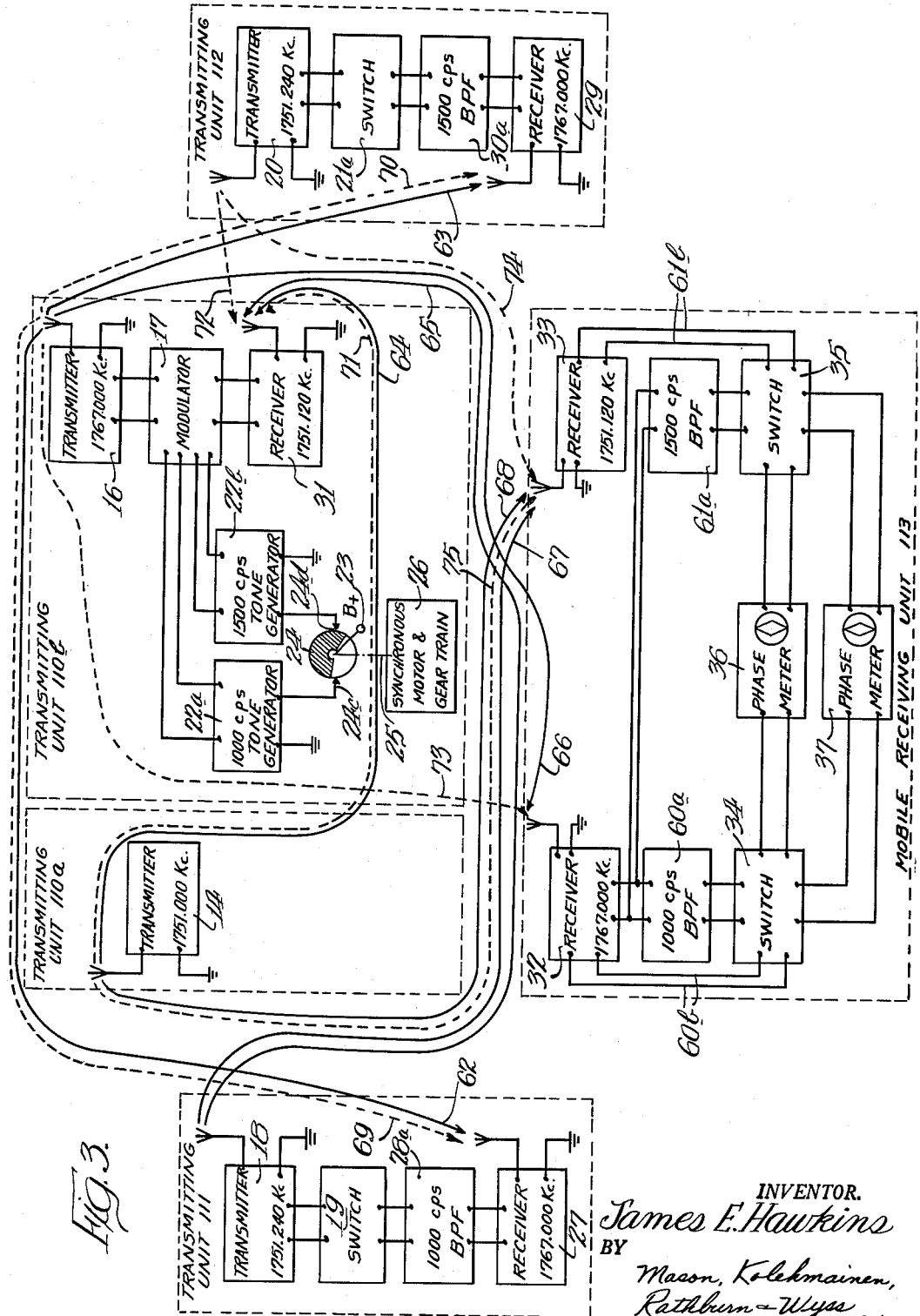

2,724,830

RADIO LOCATION SYSTEM

James E. Hawkins, Broken Arrow, Okla., assignor to Seismograph Service Corporation, Tulsa, Okla., a corporation of Delaware Application November 2, 1953, Serial No. 389,770

14 Claims. (Cl. 343—105)

The present invention relates to radio position finding systems and more particularly to improvements in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically the standing waves produced by each pair of transmitting units of the system are characterized by isophase lines which are hyperbolic in contour about the transmitting points as foci. On a line connecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it is desirable to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267 issued February 21, 1939) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of isophase lines.

While the described arrangement for obviating the phase synchronization problem is entirely satisfactory, it entails the use of two carrier channels in addition to the three or four channels taken up by the three or four continuously operating survey transmitters, in order to make up a complete system. It is desirable that the channel frequencies employed be located adjacent the broadcast band or at least below the ultra-high frequency band in order to obviate the problem of line-of-sight transmission, which of course, necessitates the location of a number of channel frequencies in the most crowded portion of the frequency spectrum, at least insofar as operations in the United States are concerned. Since frequency allocations in this band must be maintained at a minimum, it is highly desirable to provide a system which reduces the number of channels required.

One arrangement has been proposed which utilizes the principles of the Honore patent and which is intended to reduce the number of frequency channels required by alternately operating two of the position signal transmitters under the control of the signals radiated by a third position signal transmitter. Difficulties have been encountered in the operation of such systems due to the fact that a receiver must be located closely adjacent each of the alternately operated transmitters in order to receive and utilize the control signals radiated by the third transmitter. Since all of the position indicating signals differ in frequency from each other only by an audio frequency, the signals radiated by the alternately operated transmitters will block the adjacent receiver thereby resulting in improper operation of the system.

One of the principal objects of the present invention is, therefore, to provide a system of the above character in which the difficulties inherent in operating a receiver close to a relatively high power transmitting source of substantially the same frequency are eliminated.

It is a further object of the invention to provide an improved radio location system of the continuous wave type which is free of wave synchronization difficulties of the character mentioned and in which interference of one of the position signals with the receiving equipment at the alternately operable transmitting units is eliminated.

It is another object of the present invention to provide improved transmission systems for use in radio location systems of the above indicated character.

It is likewise an object of the present invention to provide improved receiving apparatus for use in radio location systems of the above indicated character.

The invention both to its organization and method of operation together with further objects and advantages thereof will best be understood by reference to the specification taken in conjunction with the accompanying drawings in which:

Fig. 1 is a diagrammatic representation of a three foci position indicating system embodying the present invention;

Fig. 2 is a diagrammatic representation of another form of receiving equipment embodying the present invention and suitable for use in the system shown in Fig. 1; and Fig. 3 is a diagrammatic representation similar to Fig. 1 but illustrating still another embodiment of the invention.

In the drawings, solid line and broken line arrows have been employed to indicate the receiving points of signal acceptance and the sources of the accepted signals during alternate periods in which certain of the transmitters are alternately operative as will be more fully described hereinafter.

Referring now to Fig. 1 of the drawings, the invention is there illustrated as embodied in a three foci hyperbolic continuous wave system for providing position information at a mobile receiving unit 13 which may be carried by a vessel or vehicle operating within the radius of transmission of a plurality of spaced transmitting units 10a, 10b, 11, and 12. The transmitting units 10a and 10b are positioned relatively close together but are preferably spaced apart a small distance in order to prevent the receiving equipment at the unit 10b from becoming blocked due to carrier wave radiation from the unit 10a as will be described in detail as the description proceeds. The transmitting units 11 and 12, on the other hand, are spaced approximately equal distances from the location of the unit 10a and are so positioned that an imaginary base line interconnecting the points of location of the units 10a and 11 is angularly related to an imaginary base line interconnecting the points of location of the units 10a and 12. As is described more fully hereinafter, each of the transmitting units 11 and 12 is equipped to radiate at spaced transmitting intervals a position indicating signal in the form of a carrier wave and to remain quiescent during the periods between the spaced transmitting intervals. The transmitting unit 10a is equipped to radiate continuously a position indicating signal in the form of a carrier wave differing in frequency from the carrier waves radiated by the units 11 and 12 whereas the transmitting unit 10b is equipped to radiate a carrier wave of still different frequency which is alternately modulated with reference signals of different frequency and is intermittently modulated with a tone switching signal. Specifically, the transmitting unit 10a comprises a continuously operative transmitter 14 and the unit 10b comprises a transmitter 15 for radiating a wave which is adapted to be simultaneously modulated with both a reference signal and a tone switching signal during a first interval and to be modulated with only a reference signal during a second interval.

As indicated by the frequencies arbitrarily assigned for the purpose of illustration and appearing in the blocks of Fig. 1 representing the component elements of the various transmitters and receivers constituting the location system, the transmitter 14 is effective to radiate a continuous carrier wave at a frequency of 1751.000 kilocycles. The transmitter 15 consists of a carrier wave oscillator 16 operative at a frequency of 1767.000 kilocycles, and a modulator 17 whereby the output of the transmitter 15 constitutes a continuous wave which, as is more fully described hereinafter, may have suitable modulation signals modulated thereon during certain periods of transmitter operation. The transmitting unit 11 comprises a normally inoperative transmitter 18 which is adapted to be rendered operative at spaced intervals by a suitable switching relay 19. The transmitter 18 when rendered operative by the relay radiates an unmodulated carrier wave at a frequency of 1751.240 kilocycles. The transmitting unit 12 comprises a normally operative transmitter 20 which is adapted to be rendered inoperative by a suitable switching relay 21 during the spaced intervals when the transmitter 18 at the unit 11 is operating and which radiates a continuous wave at a frequency of 1751.240 kilocycles identical with the frequency of the wave alternately radiated by the transmitter 18 at the unit 11.

To provide a means for cyclically modulating the carrier wave radiated by the transmitter 15 at the unit 10b with a tone switching signal in order to effect the alternate operation of the switches 19 and 21 at the units 11 and 12, respectively, there is provided at the unit 10b a tone generator 22 which is adapted to be rendered alternately operative and inoperative and which when rendered operative applies a 2000 cycle tone signal to the modulator 17 for amplitude modulation upon the carrier wave output of the transmitter 15. Cyclic operation of the tone generator 22 is accomplished by intermittently feeding anode current to the electron discharge tubes thereof from the positive terminal 23 of a suitable anode current source not shown through a commutating ring 24 which is mechanically coupled by means of a shaft 25 to a synchronous motor and gear train unit 26 in order to effect the rotation of the commutating ring at constant speed. The positive terminal 23 of the anode current source is connected to the conductive segment 24a of the commutating ring 24 which conductive segment spans approximately one-half of the circumference of the ring. The remainder of the ring 31 is composed of an insulating segment 24b and at any desired position a suitable brush 24c is provided in engagement with the periphery of the ring. This brush is connected to the positive bus conductor of the tone generator 22 and functions intermittently to deliver anode potential to the electron discharge tubes of the generator. Since the conductive segment 24a represents approximately one-half the peripheral surface of the ring 24 it will be understood that the period during which the tone generator is alternately operative is approximately equal to the period during which the tone generator is inoperative thereby effecting the operation of the transmitters 18 and 20 at the units 11 and 12 at approximately equal spaced intervals. The periodicity with which the tone generator is alternately operated is, of course, dependent upon the speed of rotation of the commutating ring 24 and in the particular embodiment of the invention shown the ring is preferably driven at a constant speed of one revolution per second so that the tone generator is intermittently rendered operative at one-half second intervals.

Referring again to the transmitting unit 11, this unit comprises, in addition to the transmitter 18 and the switching relay 19, a fixed tuned amplitude modulation receiver 27 center tuned to a frequency of 1767.000 kilocycles and selectively responsive to the modulated carrier wave radiated by the transmitter 15 at the unit 10b. The selectivity of this receiver is obviously such that the carrier wave of 1751.000 kilocycles continuously radiated by the transmitter 14 at the unit 10a and the carrier wave of 1751.240 kilocycles radiated by the transmitter 18 at the unit 11 will be rejected. During the interval when the carrier wave radiated by the transmitter 15 is modulated by a 2000 cycle tone signal from the tone generator 22 the receiver 27 at the unit 11 will reproduce this modulation signal and apply the same through band pass filter 28, which is center tuned to a frequency of 2000 cycles, to the control switch 19. The control switch 19 is of the normally open type so that the transmitter 18 is normally deenergized in the absence of signals from the band pass filter 28. However, upon the application of the 2000 cycle modulation signal to the control switch 19 this switch is energized and the transmitter 18 is placed into operation. Therefore, it is apparent that the switch 19 will maintain the transmitter 18 at the unit 11 inoperative except when the switch is energized during the interval when the carrier wave radiated by the transmitter 15 at the unit 10b is modulated with a tone signal of 2000 cycles.

Referring again to the transmitter unit 12, this unit comprises, in addition to the transmitter 20 and the control switch 21, a fixed tuned amplitude modulation receiver 29 and a band pass filter 30 center tuned to a frequency of 2000 cycles per second. The receiver 29 is center tuned to a carrier wave frequency of 1767.000 kilocycles and is designed to accept the carrier wave radiated by the transmitter 15 of the unit 10b and to reject the carrier waves radiated by the transmitter 14 at the unit 10a and the transmitter 18 at the unit 11. During the interval when the carrier wave radiated by the transmitter 15 is modulated with a 2000 cycle tone signal from the tone generator 22 the receiver 29 reproduces this modulation component at its output terminals and applies the same through the band pass filter 30 to the switching relay 21. The relay 21 is of the normally closed type so that in the absence of signals from the band pass filter 30 the transmitter 20 will be operative to radiate its carrier wave signal and, correspondingly, when signals are applied to the control switch 21 from the filter 30 the switch is energized to terminate the radiation of this carrier wave signal. Therefore, it can be seen that the transmitter 20 at the unit 12 is operative to radiate its carrier wave only during the interval when the tone generator 22 at the unit 10b is inoperative.

In order to obviate the above mentioned difficulties attendant with phase synchronization of the position indicating carrier waves radiated by the transmitters 14, 18, and 20 while at the same time eliminating the necessity for utilizing additional frequency channels there is provided at the transmitting unit 10b a means for modulating the wave radiated by the transmitter 15 with reference signals representative of the difference frequency between the carrier waves radiated by the transmitters 14 and 18 and the difference frequency between the carrier waves radiated by the transmitters 14 and 20. These reference signals may be received at any receiving point as, for example, at the mobile receiving unit 13 located within the radius of transmission of the transmitting units 10a, 10b, 11, and 12. The equipment provided at the transmitting unit 10b for effecting this reference signal radiation includes a fixed tuned amplitude modulation receiver 31 center tuned to a frequency of 1751.120 kilocycles and selectively responsive to the carrier waves radiated by the transmitter 14 at the unit 10, the transmitter 18 at the unit 11 and the transmitter 20 at the unit 12. The selectivity of this receiver is such that the carrier wave radiated by the transmitter 15 at the unit 10b is rejected. The receiver 31 thus receives two pairs of carrier waves, one pair consisting of the waves radiated by the transmitter 14 and the transmitter 18 having a frequency difference of 240 cycles therebetween and the second pair consisting of the waves radiated by transmitter 14 and the transmitter 20 also having a frequency difference of 240 cycles therebetween. The beat frequency of 240 cycles between each of the pairs of carrier waves accepted by the radio frequency section of the receiver 31 is reproduced in the audio frequency section of this receiver and delivered to the modulator 17 for amplitude modulation upon the carrier wave output of the transmitter 15.

Referring now to the equipment constituting the mobile receiving unit 13, it can be seen that this unit comprises a pair of fixed tuned amplitude modulation receivers 32 and 33, a pair of relay control switches 34 and 35, and a pair of phase measuring means or phase meters 36 and 37. As indicated in the drawings, the receiver 32 is fixed tuned to a center frequency of 1767.000 kilocycles and is designed to accept the carrier wave radiated by the transmitter 15 at the unit 10b and to reject the carrier waves radiated by all of the other transmitters. The receiver 33, on the other hand, is fixed tuned to a center frequency of 1751.120 kilocycles and is designed to accept the carrier waves radiated by the transmitter 14 at the unit 10a, the transmitter 18 at the unit 11 and the transmitter 20 at the unit 12 and to reject the carrier wave radiated by the transmitter 15 at the unit 10b. The control switches 34 and 35, which may be of any standard commercial construction, are actuated by the 2000 cycle tone signal reproduced by the receiver 32. The switches 34 and 35 are normally positioned so as to apply the signals respectively reproduced by the receivers 32 and 33 through signal connectors 34b and 35b, respectively, to the opposite sets of input terminals of the phase meter 37. When control switches 34 and 35 are energized by the 2000 cycle signals reproduced by receiver 32, the signals respectively reproduced by receivers 32 and 33 are applied through signal connectors 34a and 35a, respectively, to the opposite sets of input terminals of the phase meter 36. The phase meters 36 and 37 may be of standard commercial construction although they are preferably of the type disclosed in Hawkins et al. U. S. Patent No. 2,551,211 issued May 1, 1951. If desired, the rotatable indicating elements of the phase meters 36 and 37, which index with graduated scales positioned adjacent thereto to provide the phase indication, may be mechanically coupled to a suitable registering mechanism for counting the number of isophase lines traversed as the mobile unit 13 is moved within the radiation pattern established by the transmitters at the units 10a, 10b, 11, and 12.

Considering now the general operation of the system, when the commutating ring 24 is in the position shown in Fig. 1, anode current is supplied to the tone generator 22 in order to modulate the 1767.000 kilocycle wave radiated by the transmitter 15 with a 2000 cycle tone signal. This modulated wave, as indicated by the solid line arrow 38, is radiated to and accepted by the receiver 27 at the transmitting unit 11 which receiver reproduces the 2000 cycle modulation signal and energizes the switch 19 to place the transmitter 18 in operation. The modulated carrier wave radiated by the transmitter 15 at the unit 10b is also radiated to and accepted by the receiver 29 at the transmitting unit 12 as indicated by the solid line arrow 39. The latter receiver reproduces the 2000 cycle modulation signal and energizes the normally closed switch 21 thereby rendering the transmitter 20 inoperative. With the continuously operative transmitter 14 of the unit 10a and the transmitter 18 of the unit 11 both in operation, a pair of position indicating signals are radiated as indicated by the solid line arrows 40 and 41 which are accepted by the receiver 31 at the transmitting unit 10b. The two carrier waves accepted by this receiver are heterodyned in the radio frequency section thereof and the beat frequency signal of 240 cycles therebetween is reproduced at its output terminals and applied to the modulator 17 for amplitude modulation upon the carrier wave output of the transmitter 15 simultaneously with the modulation of the 2000 cycle tone signal from the tone generator 22. Thus, during the above indicated interval of operation the transmitter 15 radiates a carrier wave which is simultaneously modulated with a 240 cycle reference signal and a 2000 cycle tone switching signal. The two carrier waves radiated by the transmitter 14 and the transmitter 18 are also accepted by the receiver 33 as indicated by the solid line arrows 42 and 43 and are heterodyned in order to reproduce the beat frequency or difference signal of 240 cycles at the output terminals of the receiver 33 for application to the switch 35. As indicated by the solid line arrows 44, the carrier wave radiated by the transmitter 15, simultaneously modulated with 2000 cycle and 240 cycle signals, is received by the receiver 32 which reproduces both of the modulation components and applies the 2000 cycle signal to suitable switching coils (not shown) of the control switches 34 and 35 thereby energizing these switches. In its energized condition the switch 35 applies the 240 cycle beat frequency signal developed by the receiver 33 to the right hand set of input terminals of the phase meter 36. The switch 34, on the other hand, when energized by the 2000 cycle modulation signal from the receiver 32 applies the 240 cycle reference signal developed by the receiver 32 to the left hand set of input terminals of the phase meter 36 through the signal connectors 34a. Thus, the phase meter 36 has applied to its opposite sets of input terminals signals of identical frequency with the result that this meter functions to measure the phase relationship therebetween, thereby providing a position indication of the mobile receiving unit 13 relative to the transmitting units 10a and 11. The phase indication thus provided locates the receiving unit 13 between adjacent isophase lines spaced apart along the base line interconnecting the transmitting units 10a and 11 by a distance equal to one-half of the wave length of the mean or average frequency of the radiated waves represented by the solid line arrows 42 and 43. Since this mean frequency is 1751.120 kilocycles, the hyperbolic isophase lines between which the mobile unit is located are spaced apart a distance of approximately 281 feet along the base line connecting the units 10a and 11 and diverge on either side of this base line. The indication on the phase meter 36 thus identifies the position of the mobile unit 13 within a zone having a minimum width of 281 feet.

At the end of the described transmitting interval the commutating ring 24 functions to interrupt the circuit delivering anode current to the electron tubes of the tone modulator 22 with the result that the 2000 cycle tone signal is no longer modulated on the carrier wave radiated by the transmitter 15. When the 2000 cycle tone switching signal is interrupted the 2000 cycle modulation components developed at the output of the receiver 27 of the unit 11, the receiver 29 at the unit 12 and the receiver 32 at the mobile receiving unit 13 are terminated. The switch 19 at the unit 11 no longer receives excitation from the signal output of the receiver 27 and, therefore, this switch returns to its normally open position and carrier wave radiation by the transmitter 18 is terminated. At this same instant the switch 21 at the unit 12 also returns to is normally closed position due to the absence of 2000 cycle signals at the output of the receiver 29 and thus the transmitter 20 begins to radiate a position indicating signal in the form of a carrier wave at a frequency of 1751.240 kilocycles. The absence of the 2000 cycle modulation signal at the output of the receiver 32 returns the switches 34 and 35 to their normal position with the result that the input terminals to the phase meter 36 through the signal connecors 34a and 35a are both open circuited thereby preventing the phase meter 36 from altering the position of its indicating element after the expiration of the first transmitting interval.

Thus, during the second transmitting interval the continuously radiating transmitter 14 at the unit 10a and the transmitter 20 at the unit 12 are both in operation and the transmitter 18 at the unit 11 is shut off. The carrier waves radiated by the two operative transmitters are heterodyned by the receiver 31 at the unit 10b and the difference frequency signal of 240 cycles is developed at the output terminals of this receiver and is applied to the modulator 17 for amplitude modulation upon the carrier wave output of the transmitter 15. The tone generator 22 is quiescent during this interval due to the absence of anode potential at the anodes of its electron tubes and, therefore, the carrier wave radiated by the transmitter 15 is modulated with only a 240 cycle reference signal during the second interval of operation. As indicated by the "x" line arrows 46 and 47, this modulated signal is received at the receivers 27 and 29 of the units 11 and 12, respectively, but the modulation signals developed at the output terminals of these receivers are rejected by the filters 28 and 30 thus preventing energization of the switches 19 and 21 during this interval of operation. As indicated by the dotted line arrow 45 the modulated signal radiated by the transmitter 15 during this interval is received by the receiver 32 at the mobile receiving unit 13 and the 240 cycle signal developed at the output terminals of this receiver is applied to the switch 34. In the absence of 2000 cycle tone switching signals at the output of receiver 32 the switch 34 remains in its deenergized condition and the 240 cycle reference signal applied to the switch 34 is passed through signal connectors 34b to the left hand set of input terminals of the phase meter 37. The carrier waves radiated by the transmitter 14 at the unit 10a and the transmitter 20 at the unit 12 are received by the receiver 33 as indicated by the dotted line arrows 48 and 49. The difference frequency of 240 cycles between the two heterodyned carrier waves is reproduced by the receiver 33 and applied to the switch 35 which is in its normally deenergized condition due to the absence of 2000 cycle signals at the output of the receiver 32. The switch 35 thus applies the 240 cycle signal developed at the output of the receiver 33 through signal connectors 35b to the right hand set of input terminals of the phase meter 37. This phase meter is thus excited by signal voltages of identical frequency and the resultant indication is an accurate representation of the position of the mobile receiving unit 13 between adjacent isophase lines effectively produced in space as a result of carrier wave radiation by the transmitter 14 of the unit 10a and the transmitter 20 of the unit 12.

The indications on the phase meters 36 and 37 identify the position of the mobile receiving unit 13 between adjacent pairs of isophase lines of the grid-like pattern established in space by the radiations from the spaced transmitting units 10a, 11, and 12. The counting and registering mechanisms coupled to the indicating elements of each of the phase meters 36 and 37 then identifies the particular pair of isophase lines to which each phase meter indication is related.

At the end of the second transmitting interval the commutating ring 24 functions to reapply anode potential to the tubes of the tone generator 22 with the result that the carrier wave radiated by the transmitter 15 is again modulated with a 2000 cycle signal. The modulated carrier wave thus radiated is received by the receivers 27 and 29 at the units 11 and 12 both of which develop 2000 cycle tone switching signals at their output terminals. The switch 19 thus is energized to place the transmitter 18 into operation and the switch 21 is also energized to terminate the radiation of carrier waves by the transmitter 20. With the transmitter 18 in operation a complete cycle of operation has been described and the transmitting units will continue to function as described above.

Since the receiver 31 at the transmitting unit 10b is tuned to a frequency differing by only a few cycles from the frequency of the carrier wave radiated by the transmitter 14 at the unit 10a, the units 10a and 10b are preferably separated sufficiently to prevent the receiver 31 from being blocked.

The modulation of both the tone switching signal and the reference signal on the same carrier wave, that is upon the carrier wave radiated by the transmitter 15 having a different frequency than the continuously operating transmitter 14 enables the reference signal transmitter to be spaced from the continuously operating position indicating signal transmitter 14 without impairing the operation of the system. From the foregoing explanation, it will also be apparent that the receivers 27 and 29 at the end transmitting units 11 and 12 are tuned to frequencies differing by several kilocycles from the frequencies of the carrier waves respectively radiated by the transmitters 18 and 20 thereby preventing the reception by each of these receivers of the carrier wave radiated by the adjacent transmitter. Thus the problem of the blocking of these receivers and the production of cross-modulation in the mixer stages thereof due to the presence of excessively high power radiation from adjacent transmitters is completely obviated.

In the embodiment of the invention shown in Fig. 1, the transmitter 18 of the unit 11 and the transmitter 20 of the unit 12 are operated to radiate during alternate intervals of operation carrier waves of identical frequency thus necessitating the switching operation of the receivers and phase meters at the mobile receiving unit 13. If desired, the switching of the receivers and phase meters at the mobile receiving unit may be eliminated by employing the receiving equipment shown in Fig. 2 in conjunction with a transmitting system differing from that shown in Fig. 1 only by a modification of the frequency of operation of one of the transmitters and, if desired, a change in the tuning of one of the receivers. Specifically, the mobile receiving unit 13' shown in Fig. 2 is adapted to be operated with a transmitting system in which the transmitter 18 at the unit 11 is again alternately operated by energization of the switch 19 to radiate a carrier wave of 1751.240 kilocycles but the transmitter 20 at the unit 12 when alternately operated by the deenergization of the switch 21 radiates a carrier wave at a frequency of 1751.600 kilocycles. Thus, during the first interval of operation when the tone generator 22 is operative to apply a 2000 cycle modulation signal to the modulator 17, the transmitter 18 at the unit 11 is placed into operation by the switch 19 and the transmitter 20 of the unit 12 is rendered inoperative by the energization of the switch 21. The receiver 31 at the unit 10b which, in this embodiment of the invention, is preferably tuned to a center frequency of 1751.300 kilocycles, accepts the carrier wave radiated by the transmitter 18 and the carrier wave radiated by the continuously operated transmitter 14. The two carrier waves accepted by the receiver 31 are heterodyned and the 240 cycle difference frequency signal is applied to the modulator 17 thereby modulating the carrier wave radiated by the transmitter both with the 240 cycle signal from the receiver 31 and the 2000 cycle signal from the tone generator 22 during the first interval of operation.

Referring now to the mobile receiving unit 13' shown in Fig. 2 this unit comprises a pair of fixed tuned receivers 32' and 33', a pair of band pass filters 50 and 51 center tuned to a frequency of 240 cycles, a pair of band pass filters 52 and 53 center tuned to a frequency of 600 cycles and a pair of phase meters 36' and 37'. The receiver 32' as indicated in Fig. 2 is center tuned to a frequency of 1767.000 kilocycles and is designated to accept the modulated carrier wave radiated by the transmitter 15 at the unit 10b as indicated by the solid line arrow 54 and to reject the carrier waves radiated by the transmitters 14, 18, and 20. The receiver 33', on the other hand, is center tuned to a frequency of 1751.300 kilocycles and is designed to accept the carrier waves radiated by the transmitters 14, 18, and 20 and to reject the modulated carrier wave radiated by the transmitter 15 at the unit 10b. The 2000 cycle signal modulated upon the carrier wave radiated by the transmitter 15 during the first interval of operation is reproduced by the receiver 32' and is rejected by both of the band pass filters 50 and 52. The 240 cycle reference signal modulated upon this carrier wave as a result of the heterodyne action at the receiver 31 is reproduced by the receiver 32' and applied through the band pass filter 50 to the left hand set of input terminals of the phase meter 36', the band pass filter 52 functioning to prevent the application of this reference signal to the input terminals of the phase meter 37'. As indicated by solid line arrows 55 and 56, the carrier waves radiated by the transmitter 18 and the transmitter 14 are both accepted by the receiver 33' which functions to heterodyne these waves and reproduce a 240 cycle beat frequency signal which is applied through the band pass filter 51 to the right hand set of input terminals of the phase meter 36'. The phase meter 36', therefore, provides an indication of the position of the mobile receiving unit between adjacent isophase lines effectively produced in space as a result of the carrier wave radiation by the transmitters at the units 10a and 11.

When the tone generator 22 is rendered inoperative by the commutating ring 24 the switches 19 and 21 function to terminate the radiation of carrier waves by the transmitter 18 at the unit 11 and to initiate the radiation of carrier waves by the transmitter 20 at the unit 12. As indicated above, the transmitter 20 radiates a position indicating signal in the form of a carrier wave having a frequency of 1751.600 kilocycles which is heterodyned at the receiver 31 with the 1751.000 kilocycle carrier wave radiated by the transmitter 14. The 600 cycle difference frequency between these two heterodyned waves is reproduced at the output terminals of the receiver 31 and applied to the modulator 17 for amplitude modulation upon the carrier wave output of the transmitter 15 during the second interval of operation. As indicated by the dotted line arrow 57, the carrier wave from the transmitter 15 is accepted by the receiver 32' and the 600 cycle modulation component is reproduced by the receiver and applied through the band pass filter 52 to the left hand set of input terminals of the phase meter 37'. As indicated by the dotted line arrows 58 and 59, the two carrier waves radiated by the transmitter 14 of the unit 10 and the transmitter 20 of the unit 12 are accepted and heterodyned by the receiver 33' and the difference frequency therebetween is reproduced by this receiver and applied through the band pass filter 53 to the right hand set of input terminals of the phase meter 37'. This phase meter thus provides an indication which is representative of the position of the mobile receiving unit 13' between adjacent isophase lines effectively produced in space as a result of carrier wave radiation by the transmitter 14 at the unit 10a and the transmitter 20 at the unit 12. The phase meters 36' and 37' thus provide indications for locating the mobile unit between adjacent pairs of isophase lines forming a grid-like pattern effectively produced in space as a result of carrier wave radiation by the transmitters at the units 10a, 11, and 12. Identification of the particular pairs of isophase lines between which the receiving unit is located is effected by the registering mechanism coupled to the indicating elements of the phase meters 36' and 37' for counting the number of complete revolutions of each of the indicating elements as the isophase lines are traversed.

A third embodiment of the invention is shown in Fig. 3 employing four spaced transmitting units 110a, 110b, 111, and 112 and a mobile receiving unit 113 differing only slightly from the transmitting and receiving equipment employed in the system shown in Fig. 1. To provide a clear indication of the similarities and differences existing between the transmitting and receiving equipment of the system shown in Fig. 3 and the location system illustrated in Fig. 1, those elements of the former system which are identical to those of the latter have been assigned corresponding reference characters whereas those elements of the system shown in Fig. 3 which are different have been assigned reference characters suffixed by a suitable letter of the alphabet.

It therefore becomes apparent that the transmitting unit 111 is identical to the unit 11 of Fig. 1 except for a change in the frequency of operation of the band pass filter, the filter 28a of the unit 111 being center tuned to a frequency of 1000 cycles per second. The unit 112, on the other hand, differs from the unit 12 by the inclusion of a band pass filter 30a center tuned to a frequency of 1500 cycles per second and also by a change in the mode of operation of the relay control switch, the switch 21a being of the normally open type which is designed to close when actuated by a signal from the band pass filter 30a. It is also apparent that the transmitting unit 110b differs from the transmitting unit 10b shown in Fig. 1 by the provision of a pair of tone signal generators 22a and 22b for providing a pair of tone switching signals of different frequency to the modulator 17 for amplitude modulation upon the carrier wave output of the transmitter 15. The mobile receiving unit 113 shown in Fig. 3 is identical to the mobile receiving unit 13 of the system illustrated in Fig. 1 except for the addition of a pair of band pass filters 60a and 61a tuned to frequencies corresponding to the tone switching signals modulated upon the carrier wave output of the transmitter 15.

Turning now to the operation of the system shown in Fig. 3, when the commutating ring 24 is in the position shown, anode potential is applied to the electron discharge tubes of the tone generator 22a which functions to provide a 1000 cycle modulation signal to the modulator 17 for amplitude modulation upon the carrier wave output of the transmitter 15. The carrier wave radiated by the transmitted 15 modulated with a 1000 cycle signal during the first interval of operation is received, as indicated by the solid line arrows 62 and 63, by the receivers 27 and 29 at the units 111 and 112, respectively. The 1000 cycle modulation signal is reproduced at the output of the receiver 27 at the transmitting unit 111 and is passed by the filter 28a to energize the normally open switch 19 thus placing the transmitter 18 in operation. The 1000 cycle signal is also reproduced by the receiver 29 at the transmitting unit 112 but the band pass filter 30a functions to reject this 1000 cycle signal thereby preventing energization of the normally open switch 21a and insuring that the transmitter 20 remains inoperative during the interval when the carrier wave radiated by the transmitter 15 is modulated with a 1000 cycle tone switching signal.

During the first interval, therefore, the transmitter 14 and the transmitter 18 are both radiating carrier waves which, as indicated by solid line arrows 64 and 65, are accepted by the receiver 31 and are heterodyned in order to produce a 240 cycle beat frequency signal to be applied to the modulator 17 for modulation upon the carrier wave radiated by the transmitter 15. Therefore, during the first transmitting interval the carrier wave radiated by the transmitter 15 is simultaneously modulated with a 1000 cycle tone switching signal and a 240 cycle reference signal. As indicated by the solid line arrow 66, the modulated carrier wave radiated by the transmitter 15 is received by receiver 32 which reproduces both of the modulation signals at its output, the 1000 cycle switching signal being applied through the band pass filter 60a to energize the control switch 34 and the 240 cycle reference signal being applied through signal connectors 60b to suitable contacts of the switch 34. When the switch 34 is energized by the signal output of the band pass filter 60a the 240 cycle reference signal from the control switch 34 is applied to the left hand set of input terminals of the phase meter 36. As indicated by solid line arrows 67 and 68, the carrier waves radiated by the transmitters 14 and 18 during this particular interval of operation are accepted by the receiver 33 and are heterodyned to produce a 240 cycle difference frequency signal for application through signal connectors 61b to suitable contacts of the control switch 35. The band pass filter 61a prevents the 1000 cycle switching signal appearing at the output of receiver 32 from energizing the control switch 35 during this interval and in its normally deenergized condition this switch applies the 240 cycle heterodyne signal output of the receiver 33 to the right hand set of input terminals of the phase meter 36. The phase meter 36 thus provides an indication of the position of the mobile receiving unit between isophase lines effectively produced in space between the transmitting units 110a and 111.

When the above described transmitting interval is terminated by the interruption of anode potential to the tone generator 22a from positive terminal 23 due to rotation of the commutating ring 24, the 1000 cycle tone switching signal is no longer modulated upon the carrier wave radiated by the transmitter 15. The receiver 27 at the unit 111 no longer reproduces a 1000 cycle signal and the switch 19 is deenergized to cease carrier wave radiation by the transmitter 18. The absence of the 1000 cycle signal at the output of the receiver 32 at the mobile unit returns the switch 34 to its normal position and interrupts the circuit connection between the left hand set of terminals of the phase meter 36 and the signal connectors 60b with the result that the phase meter 36 is rendered ineffective to alter the position of its indicating element after the expiration of the first transmitting interval.

Immediately after the tone generator 22a is rendered inoperative the commutating ring 24 functions to deliver anode potential from positive terminal 23 through brush 24d to the electron discharge tubes of the tone generator 22b with the result that a 1500 cycle tone switching signal is applied to the modulator 17 for amplitude modulation upon the carrier wave radiated by the transmitter 15. As indicated by the dotted line arrow 69, the carrier wave thus radiated is received by the receiver 27 at the unit 111 but the band pass filter 28a prevents the application of this modulation signal to the control switch 19 thereby maintaining the transmitter 18 inoperative during the second interval of operation. The receiver 29 of the transmitting unit 112 also receives the modulated carrier wave radiated by the transmitter 15 as indicated by the dotted line arrow 70 and the 1500 cycle modulation signal is reproduced and applied through the band pass filter 30a to the control switch 21 thereby energizing the switch and rendering the transmitter 20 operative during the second transmitting interval. With the transmitter 14 and the transmitter 20 in operation the receiver 31 at the transmitting unit 110b heterodynes the carrier waves radiated thereto, as indicated by dotted line arrows 71 and 72, and the 240 cycle frequency difference between these carrier waves is reproduced. The difference frequency appearing at the output of receiver 31 is applied to the modulator 17 for radiation as a reference signal on the carrier wave output of the transmitter 15. Thus during the second transmitting interval the carrier wave radiated by the transmitter 15 has impressed thereon a 1500 cycle tone switching signal from tone generator 22b and a 240 cycle reference signal from receiver 31. As indicated by dotted line arrow 73, the modulated signal from transmitter 15 is received by receiver 32 at the mobile unit and both of the modulation components are reproduced at the output of this receiver, the 240 cycle signal being applied through signal connectors 60b to suitable contacts of the control switch 34. The 1500 cycle switching signal is applied through the band pass filter 61a to energize the control switch 35 but the band pass filter 60a prevents the application of this signal to the control switch 34 thereby maintaining the latter switch in its deenergized condition during the second transmitting interval. In its deenergized condition the control switch 34 applies the 240 cycle reference signal output of the receiver 32 appearing across signal connectors 60b to the left hand set of input terminals of the phase meter 37 thus providing a reference signal for phase comparison with the 240 cycle heterodyne signal developed at the output of the receiver 33 as a result of heterodyning the carrier waves radiated by the transmitter 20 and the transmitter 14 as indicated by dotted line arrows 74 and 75. In its energized condition the control switch 35 applies the output of the receiver 33 to the right hand set of input terminals of the phase meter 37. The opposite sets of input terminals of this meter are thus energized by signal voltages of indentical frequency. The indication on the phase meter 37 is therefore representative of the position of the mobile receiving unit 113 between adjacent isophase lines existing between the transmitting units 110a and 112.

Although the transmitters 18 and 20 at the units 111 and 112 have been shown in Fig. 3 as alternately radiating carrier waves of identical frequency it is apparent that the frequency of one of these transmitters could be altered slightly in order to modulate the carrier wave radiated by the transmitter 15 at the unit 110b with reference signals of different frequency during the spaced intervals of operation. If the frequencies of the waves radiated by the transmitters 18 and 20 are different the switches 34 and 35 and their associated tone signal band pass filters at the mobile receiving unit 113 could be eliminated and a mobile receiving unit similar to that shown in Fig. 2 could be employed.

If desired suitable band pass filters may be employed in the mobile receiving unit 13 of Fig. 1 and in the mobile receiving unit 113 of Fig. 3 for the purpose of isolating the phase meters from the 2000 cycle, 1000 cycle and 1500 cycle switching signals. Thus, referring to Fig. 1 a suitable 240 cycle band pass filter may, if desired, be inserted in the signal connectors 34a between the switch 34 and the phase meter 36 to isolate the phase meter 36 from the 2000 cycle modulation signal, and if this is done an identical filter should be inserted in the signal connectors 35a to compensate for any phase shift produced in the 240 cycle reference signal by the filter in the connectors 34a. The use of these band pass filters is not essential, however, since the 2000 cycle signal is never applied to both sets of terminals of the phase meter 36. Similarly in Fig. 3 band pass filters may, if desired, be inserted in the connections between the switches 34 and 35 and the phase meters 36 and 37 to isolate the phase meters from the 1000 cycle and 1500 cycle switching signals alternately appearing at the output terminals of the receiver 32.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. A wave signal transmission system comprising a first transmitter and a second transmitter for radiating position indicating signals, a third transmitter for radiating additional position indicating signals, a fourth transmitter for radiating carrier wave signals at a frequency differing from all of said position indicating signals, means responsive to said carrier wave signals for alternately rendering said first and second transmitters operative, and means responsive to the position indicating signals radiated by said third transmitter and by the operative one of said first or second transmitters for modulating the carrier wave signals radiated by said fourth transmitter with reference signals.

2. A wave signal transmission system comprising a first and a second transmitter for radiating position indicating signals, a third transmitter for radiating additional position indicating signals, a fourth transmitter for radiating carrier wave signals at a frequency differing from all of said position indicating signals, means for intermittently modulating the carrier wave radiated by said fourth transmitter with modulation signals, means including receivers associated with said first and second transmitters for reproducing said modulation signals, switching means responsive to said modulation signals for alternately rendering said first and second transmitters operative, and heterodyning means associated with said fourth transmitter for heterodyning the position indicating signals radiated by said third transmitter and by the operative one of said first or second transmitters for modulating the carrier wave signal radiated by said fourth transmitter with reference signals.

3. A wave signal transmission system comprising a normally operative first transmitter and a normally inoperative second transmitter for radiating position indicating signals, a third transmitter for radiating additional position indicating signals, a fourth transmitter for radiating carrier wave signals at a frequency differing from all of said position indicating signals, means for intermittently modulating the carrier wave radiated by said fourth transmitter with a modulation signal, receiving means associated with said second transmitter for reproducing said modulation signal, switching means responsive to the modulation signal for rendering said second transmitter operative, receiving means associated with said first transmitter for reproducing said modulation signal, switching means responsive to said modulation signal for rendering said first transmitter inoperative, and heterodyning means associated with said fourth transmitter for heterodyning the position indicating signal radiated by said third transmitter and by the operative one of said first or second transmitters for modulating the carrier wave signals radiated by said fourth transmitter with reference signals.

4. A wave signal transmission system comprising a first transmitter and a second transmitter for radiating position indicating signals at the same frequency, a third transmitter for radiating other position indicating signals at a different frequency, a fourth transmitter for radiating carrier wave signals at a frequency differing from all of said position indicating signals, means for intermittently modulating said carrier wave signal, means for reproducing said modulation signal at the first and second transmitters, switching means responsive to said modulation signals for rendering said first and second transmitters alternately operative, and heterodyning means associated with said fourth transmitter for heterodyning the position indicating signals radiated by said third transmitter and by the operative one of said first or second transmitters for modulating the carrier wave signals radiated by said fourth transmitter with reference signals.

5. A wave signal transmission system comprising a first transmitter and a second transmitter alternately operative to radiate position indicating signals at different frequencies, a continuously operative third transmitter for radiating additional position indicating signals, a fourth transmitter for radiating carrier waves at a frequency differing from all of said position indicating signals, means for heterodyning the position indicating signals radiated by said third transmitter and the position indicating signal radiated by said first transmitter during the interval when said first transmitter is operative to produce a first difference frequency signal, means for modulating said first difference frequency signal upon said carrier wave signal radiated by the fourth transmitter, means for heterodyning the position indicating signals radiated by said third transmitter and the position indicating signal radiated by said second transmitter during the interval when said second transmitter is operative to produce a second difference frequency signal, means for modulating said second difference frequency signal upon said carrier wave signal radiated by the fourth transmitter, and means responsive to said carrier wave signal for effecting the alternate operation of said first and second transmitters.

6. A wave signal transmission system comprising a first transmitter and a second transmitter for radiating position indicating signals at different frequencies, a continuously operative third transmitter for radiating additional position indicating signals at a still different frequency, a fourth transmitter for radiating carrier wave signals at a frequency differing from all of said position indicating signals, means for alternately modulating the carrier wave radiated by said fourth transmitter with a modulation signal, means including receivers associated with said first and second transmitters for reproducing said modulation signal, switching means responsive to said reproduced modulation signal for alternately rendering said first and second transmitters operative, heterodyning means associated with said fourth transmitter for heterodyning the position indicating signals radiated by said third transmitter and said first transmitter to produce a first difference frequency signal during the interval when said first transmitter is operating, modulating means for modulating the carrier wave radiated by said fourth transmitter with a reference signal related to said first difference frequency signal thereby simultaneously modulating said carrier wave with a reference signal and with said modulation signal, and heterodyning means for heterodyning the position indicating signals radiated by said third transmitter and said second transmitter to produce a second difference frequency signal during the interval when said second transmitter is operating, said modulating means being effective to modulate the carrier wave radiated by said fourth transmitter with a reference signal related to said second difference frequency signal during the interval when said carrier wave is not modulated with said modulation signal.

7. A wave signal transmission system comprising a normally operative first transmitter and a normally inoperative second transmitter for radiating position indicating signals, a third transmitter for radiating an additional position indicating signal, a fourth transmitter for radiating carrier wave signals at a frequency differing from all of said position indicating signals, means for intermittently modulating the carrier wave radiated by said fourth transmitter with a tone signal, receiving means associated with said second transmitter for reproducing said tone signal, switching means responsive to the tone signal for rendering said second transmitter operative, receiving means associated with said first transmitter for reproducing said tone signal, switching means responsive to said tone signal for rendering said first transmitter inoperative, heterodyning means associated with said fourth transmitter for heterodyning the position indicating signals radiated by said third transmitter and said first transmitter during the interval when said first transmitter is operating and for reproducing a first difference frequency signal, modulating means for modulating the carrier wave radiated by said fourth transmitter with a reference signal related to said first difference frequency signal thereby simultaneously modulating said carrier wave with a reference signal and with said tone signal, said heterodyning means being operative to heterodyne the carrier waves radiated by said third transmitter and said second transmitter during the interval when said second transmitter is operating to produce a second difference frequency signal, said modulating means being operative to modulate the carrier wave radiated by said fourth transmitter with a reference signal related to said second difference frequency signal between the intervals when the carrier wave radiated by said fourth transmitter is modulated with said tone signal.

8. A wave signal transmission system comprising a first transmitter and a second transmitter for radiating position indicating signals, a third transmitter for radiating additional position indicating signals, a fourth transmitter for radiating a carrier wave signal at a frequency differing from all of said position indicating signals, means for alternately modulating said carrier wave signal with modulation signals of different frequency, means associated with said first transmitter and responsive to only one of said modulation signals for alternately rendering said first transmitter operative, means associated with the second transmitter and responsive only to another of said modulation signals for alternately rendering said second transmitter operative whereby said first and second transmitters are rendered operative during different intervals, means including a receiver associated with said fourth transmitter for heterodyning the position indicating signals radiated by said third transmitter and by the operative one of said first or second transmitters and for modulating the carrier wave signals radiated by said fourth transmitter with reference signals.

9. A wave signal transmission system comprising a normally operative first transmitter and a normally inoperative second transmitter for radiating position indicating signals, a third transmitter for radiating additional position indicating signals, a fourth transmitter for radiating a carrier wave signal at a frequency differing from all of said position indicating signals, means for alternately modulating said carrier wave signal with tone modulation signals of different frequency, means associated with said first transmitter and responsive to only one of said modulation signals for alternately rendering said first transmitter operative, means associated with the second transmitter and responsive only to another of said modulation signals for alternately rendering said second transmitter operative whereby said first and second transmitters are rendered operative during different intervals, and means including a receiver associated with said fourth transmitter for heterodyning the position indicating signals radiated by said third transmitter and by the operative one of said first or second transmitters to produce reference signals and for modulating the carrier wave signals radiated by said fourth transmitter with said reference signals.

10. A wave signal transmission system comprising a first transmitter and a second transmitter for radiating position indicating signals at different frequencies, a continuously operating third transmitter for radiating position indicating signals at a still different frequency, and a fourth transmitter for radiating carrier wave signals at a frequency differing from all of said position indicating signals, means for alternately modulating said carrier wave signal with tone modulation signals of different frequency, means associated with said first transmitter and responsive to only one of said modulation signals for alternately rendering said first transmitter operative, means associated with the second transmitter and responsive only to another of said modulation signals for alternately rendering said second transmitter operative whereby said first and second transmitters are rendered operative during different intervals, heterodyning means associated with said fourth transmitter for heterodyning the position indicating signals radiated by said third transmitter and by first transmitter during the interval when said first transmitter is operating to reproduce a first difference frequency signal, modulating means for modulating the carrier wave radiated by said fourth transmitter with a reference signal related to said first difference frequency signal during the interval when said carrier wave is modulated by said one tone signal, said heterodyning means being operative to heterodyne the position indicating signals radiated by said third transmitter and by said second transmitter during the interval when said second transmitter is operating to reproduce a second difference frequency signal, and said modulating means being effective to modulate the carrier wave radiated by said fourth transmitter with a reference signal related to said second difference signal when said carrier wave is modulated by the other tone modulation signal.

11. A wave signal transmission system comprising first and second transmitters for radiating position indicating signals at different frequencies, a continuously operating third transmitter for radiating position indicating signals at a still different frequency, and a fourth transmitter for radiating carrier wave signals at a frequency differing from all of said position indicating signals, means for alternately modulating said carrier wave signal with modulation signals of different frequency, receiving means associated with said second transmitter for reproducing said modulation signals, switching means responsive to only one of said modulation signals for rendering said second transmitter operative, receiving means associated with said first transmitter for reproducing said modulation signals, switching means responsive only to the other modulation signal for rendering said first transmitter operative, heterodyning means associated with said fourth transmitter for heterodyning the carrier waves radiated by said third transmitter and by said first transmitter during the interval when said first transmitter is operative and for reproducing a first difference frequency signal, modulating means for modulating said first difference frequency signal upon the carrier wave signals radiated by said fourth transmitter during the interval when said fourth transmitter is modulating said one tone modulated signal, said heterodyning means being operative to heterodyne the position indicating signals radiated by said third transmitter and by said second transmitter during the interval when said second transmitter is operative and for reproducing a second difference frequency signal, and said modulating means being operative to modulate the carrier wave signals radiated by said fourth transmitter with said second difference frequency signal during the interval when said fourth transmitter carrier wave is modulated by said other modulation signal.

12. In a position determining system having a receiving point, at least three spaced transmitting units for radiating position indicating signals, a fourth transmitting unit including means for continuously radiating a carrier wave signal at a frequency differing from said position indicating signals, means for alternately modulating said carrier wave with modulation signals at spaced intervals, means responsive to said modulation signals for alternately rendering the first and second of said three transmitting units inoperative, heterodyning means at said receiving point for reproducing the beat frequency between the position indicating signals radiated by the operative pair of said three transmitting units, means at said fourth transmitting unit for obtaining the beat frequency between the position indicating signals radiated by the operative pair of said three transmitting units and for modulating said carrier wave signal therewith, and means at said receiving point for indicating the phase relationship between said beat frequencies.

13. In a position determining system having a receiving point, at least three spaced transmitting units for radiating position indicating signals, a fourth transmitting unit including means for continuously radiating a carrier wave signal at a frequency different from said position indicating signals, means for alternately modulating said carrier wave with modulation signals of different frequency at spaced intervals, means responsive to different ones of said modulation signals for alternately rendering the first and second of said three transmitting units inoperative, means at said fourth unit for heterodyning the position indicating signals radiated by the operative pair of said three transmitting units and for modulating the difference frequency signal obtained upon said carrier waves, means at said receiving point for obtaining the beat frequency between the position indicating signals radiated by the operative pair of said three transmitting units, and means at said receiving point for receiving said modulated carrier wave and for comparing the phase of said beat frequency with the phase of the difference frequency signal modulated on said carrier wave.

14. In a position determining system having a receiving point, at least three spaced transmitting units for radiating position indicating signals, a fourth transmitting unit including means for continuously radiating a carrier wave signal at a frequency different from said position indicating signals, means for alternately modulating said carrier wave signal with modulation signals of different frequency at spaced intervals, means responsive to different ones of said modulation signals for alternately rendering the first and second of said three transmitting units inoperative, heterodyning means at said fourth unit for heterodyning the position indicating signals radiated by the first and third transmitting units to obtain a first reference signal, means for modulating the first reference signal upon said carrier wave, heterodyning means at said receiving point for obtaining the beat frequency between the position indicating signals radiated by the first and third of said transmitting units, indicating means at said receiving point for comparing the phase of said beat frequency with the phase of the first reference signal modulated on said carrier wave, the heterodyning means at said receiving point being operative to heterodyne the position indicating signals radiated by the second and third of said transmitting units to produce a second difference frequency signal, the heterodyning means at said fourth unit being operative to heterodyne the position indicating signals radiated by the second and third transmitting units to obtain a second reference signal, the modulating means at said fourth unit being effective to modulate the second reference signal upon said carrier wave, second indicating means at said receiving point for indicating the phase relationship between said second difference frequency signal and said second reference signal, and means responsive to different ones of said modulation signals for alternately rendering said indicating means operative to measure said phase relationships.

References Cited in the file of this patent

UNITED STATES PATENTS 2,503,836     O'Brien _____ Apr. 11, 1950